E. TYDEN.
SEAL LOCKING DEVICE.
APPLICATION FILED FEB. 26, 1915.
1,155,771. Patented Oct. 5, 1915.
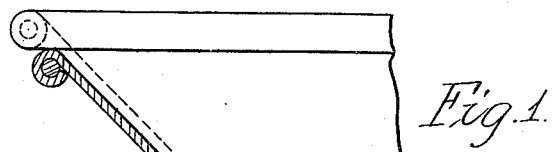
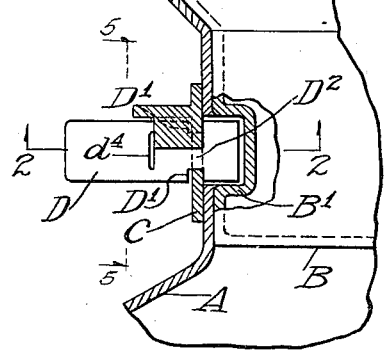
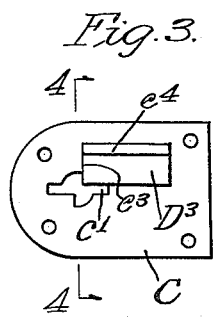
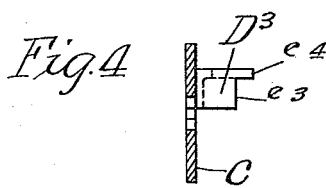
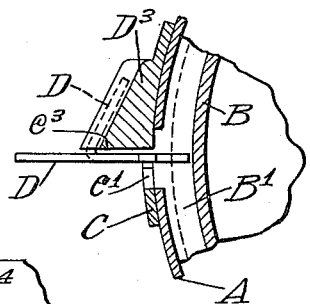
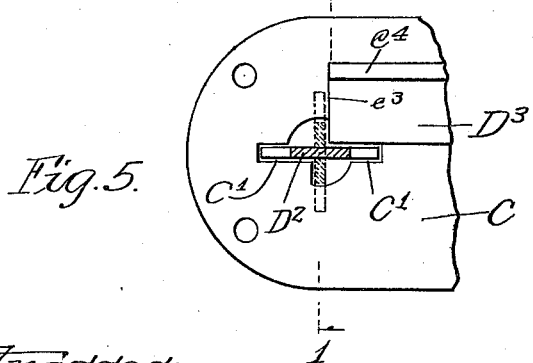
Witnesses:
Inventor:
Emil Tyden
by Burton & Burton
his attys.

UNITED STATES PATENT OFFICE.

EMIL TYDEN, OF EVANSTON, ILLINOIS.

SEAL-LOCKING DEVICE.

1,155,771.   Specification of Letters Patent.   Patented Oct. 5, 1915.

Application filed February 26, 1915. Serial No. 10,816.

*To all whom it may concern:*

Be it known that I, EMIL TYDEN, a citizen of the United States, residing at Evanston, in the county of Cook and State of Illinois, have invented new and useful Improvements in Seal-Locking Devices, of which the following is a specification, reference being had to the accompanying drawings, forming a part thereof.

The purpose of this invention is to provide an improved seal-locking device particularly of the type adapted for securing together two members, as of a can for example, having telescoped, interlapped or overlapping parts which are engaged by the seal-locking device.

It consists in the elements and features of construction shown and described in the drawings as indicated in the claims.

In the drawings: Figure 1 is a radial section of a portion of a can having this invention applied to it. Fig. 2 is a section at the line 2—2 on Fig. 3. Fig. 3 is a section at the line 3—3 on Fig. 2. Fig. 4 is a detail section at the line 4—4 on Fig. 3. Fig. 5 is a section at the line 5—5 on Fig. 1.

In the drawings, A, represents the body of the can and, B, the cover telescoped therewith.

C, is the mount for the seal bolt which is a metal fitting adapted to be riveted upon the outer side of the can body, having an aperture, $C^1$, through which the seal bolt is to protrude for engaging above a shoulder, $B^1$, upon the cover to prevent withdrawal of the cover when the seal bolt is thus engaged. The seal bolt is a flat strip of metal, D, reduced in width by notches, $D^1$, $D^1$, a little distance back from the end which is to engage the shoulder, $B^1$, of the can cover, the width of the notches being sufficient to accommodate the thickness of the web of the mount at the point at which the aperture, $C^1$, is formed, and the aperture, $C^1$, is oblong corresponding to the cross section of the seal bolt, but with an enlarged or widened portion in the middle of its length large enough to permit the neck, $D^2$, produced by cutting the notches, $D^1$, as described in the seal bolt to turn in the aperture after the seal bolt has its end thrust therethrough to bring the notches, $D^1$, registering with the margins of the aperture.

On the outer side of the mount at one side of the aperture, and at one side of the position of the seal bolt after the latter has been inserted through the aperture and turned 90 degrees as described, that is to say, in the angle between said position of the bolt and the longitudinal extent of the aperture is formed an outwardly protruding boss having an angular corner, $c^3$, extending transversely of the length of the aperture, and its outer face sloped back from said angular corner to the general plane of the outer surface of the mount. Just beyond this point, the mount has an upstanding projection, $c^4$. The seal bolt, D, is weakened at a transverse line positioned so as to coincide substantially with the angular corner, $c^3$, of the boss, $D^3$, when the seal bolt has been inserted and turned to locking position, this weakening being conveniently formed by making a transverse slot, $d^4$, in the seal bolt. When the seal bolt has been thrust through the mount and turned to locked position it is folded transversely at the weakened line down onto the sloping face of the boss, $D^3$, and thereby caused to extend one lateral edge past the projection, $c^4$. When in this position, it will be seen that the seal bolt cannot be turned so that its head may be withdrawn from the aperture, $C^1$, of the mount, unless it is first straightened back at the weakened line, so as to clear the projection, $c^4$, and the weakening and character of the seal bolt is such that it will not endure such weakening without breaking at the weakened line, thereby disclosing that it has been tampered with. The chief reason for providing the boss or upraise, $D^3$, is to locate the weakened and holding and breaking line of the seal bolt at a distance away from the neck, merely because if the folding were caused to occur at the neck, there might be too great danger of breaking even in the folding to locked position, or in the ordinary handling of the can after it was thus sealed, without any straightening back or attempt at such straightening. It may not be necessary under all circumstances under which such seals might be used to take this precaution, that is to say, the upraise boss, $D^3$, might be omitted without departing from the principle or idea of the invention, and in that event the mere cutting of the notches, $d^1$, to form the neck of the seal bolt, might constitute sufficient weakening and dispense with means of weakening the seal consisting of a slot, $d^4$.

I claim:—

1. A flat seal bolt having an engaging head reduced in width back of the head to form a relatively narrow neck, in combination with a mount having an aperture through which the head can enter and in which the neck can turn to cause the head to extend crosswise of the aperture, a mount having a projection extending adjacent to the edge of the seal bolt at its said crosswise position, said seal bolt being adapted for folding at a transverse line position to cause the folded portion to abut edgewise on said projection, and adapted to break upon being straightened back into alinement with the engaged portion.

2. A flat seal bolt having an engaging head and reduced in width back of the head to form a relatively narrow neck, in combination with a mount having an aperture through which the head can enter and in which the neck can turn to cause the head to extend cross-wise of the aperture, the mount having at its forward or outer side a boss having a shoulder which extends adjacent to the face of the seal bolt at said crosswise position and which affords a corner over which the seal bolt may be folded or bent, the mount also having a projection extending adjacent to the edge of the seal bolt at its said crosswise position before folding, said seal bolt being weakened for folding at a transverse line substantially coincident with said shoulder at the engaged position of the seal bolt to cause the folded portion to abut edgewise on said projection, and being adapted to break upon being straightened back into alinement with the engaged portion.

In testimony whereof I have hereunto set my hand at Chicago, Illinois, this 8th day of February, 1915.

EMIL TYDEN.

Witnesses:
EDNA M. MACINTOSH,
LUCY I. STONE.

Copies of this patent may be obtained for five cents each, by addressing the "Commissioner of Patents, Washington, D. C."